United States Patent Office 3,054,750
Patented Sept. 18, 1962

3,054,750
METHOD FOR INHIBITING CORROSION CAUSED BY OIL WELL FLUIDS
Samuel E. Jolly, Ridley Park, Pa., assignor to Sun Oil Company, Philadelphia, Pa., a corporation of New Jersey
No Drawing. Filed June 7, 1957, Ser. No. 664,193
7 Claims. (Cl. 252—8.55)

This invention relates to new compositions and to their preparation and use as corrosion inhibitors.

Protection of metal surfaces from corrosion is an important factor in many fields of technology. One manner of providing such protection is by use of a corrosion inhibitor which forms an adsorbed protective film on a metal surface, which film resists attack of the surface by corrosive agents in fluids with which the surface would otherwise come in direct contact. The present invention provides a highly effective corrosion inhibitor for such use.

One application of corrosion inhibition which is of great importance in petroleum production is the inhibition of corrosion normally caused by corrosive oil well fluids such as mixtures of crude oil and brine. Corrosion of metal tubing, casing, pumps and other equipment used in producing oil from wells is a particularly difficult problem in petroleum production. The mixtures of crude oil and brine which are produced in most wells are highly corrosive to the metals of which such equipment is commonly constructed, particularly when the brine contains hydrogen sulfide, carbon dioxide or other acidic materials.

The novel compositions according to the invention, which compositions are useful as corrosion inhibitors and for other purposes, are certain amino acids and salts thereof with acidic or basic materials or both. The amino acids have the formula

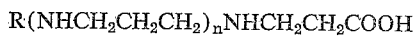

where R is a hydrocarbon radical having 12 to 30 carbon atoms, and $n$ is an integer from 0 to 5. R is preferably aliphatic or cycloaliphatic. In a preferred embodiment it contains the hydrocarbon residue of petroleum naphthenic acids.

Petroleum naphthenic acids are carboxylic acids recoverable by known procedures from petroleum. Complex mixtures of such acids having widely varying molecular weight and chemical structure in the hydrocarbon residue and including the range of 12 to 30 carbon atoms are available in petroleum. In one embodiment, the amino acids employed according to the invention are mixtures of compounds wherein R in the above formula varies from compound to compound through a range of at least 3 carbon atoms, more preferably at least 5 carbon atoms.

Examples of amino acids according to the invention are $C_{19}H_{29}CH_2NHCH_2CH_2COOH$ where $C_{19}H_{29}$ is the abietyl radical derived from abietic acid, N-hexadecenyl alanine, N-naphthenylalanine, etc.

In one embodiment, the invention involves salts of amino acids as previously defined. The salts can contain a nitrogen atom or atoms of the amino acid neutralized with an acidic material, e.g. hydrochloric acid, sulfuric acid, acetic acid, caprylic acid, stearic acid, oleic acid, abietic acid, petroleum naphthenic acids, acids obtained by partial oxidation of hydrocarbons, phosphoric acid, alkyl benzene sulfonic acids, petroleum sulfonic acids, salicylic acid, mercaptobenzothiazol, alkyl mercaptothiazols, phenylacetic acid, benzoic acid, picric acid, thiocyanic acid, nicotinic acid, oxalic acid, maleic acid, oleic acid, etc. Preferably the acid employed to make such salt contains 12 to 30 carbon atoms per molecule.

The salts can contain the carboxyl group of the amino acid neutralized with a basic material, e.g. ammonia, sodium hydroxide, potassium hydroxide, calcium hydroxide, hydrazine, aliphatic monoamines, diamines and other polyamines, and alicyclic amines such as those listed in Tables I, II and III of Kirk and Othmer's "Encyclopedia of Chemical Technology, volume 1, pages 706–7 (1947), aromatic monoamines, diamines and heterocyclic amines as listed on pages 712–3 of the same volume, aminoalcohols such as ethanolamine, diethanolamine, triethanolamine and homologs thereof, aminophenols, salt-forming heterocyclic nitrogen compounds such as pyrrole, indole, carbazole, pyrazole, imidazolines, benzimidazoles, oxazoles, benzothiazol, pyridine, piperidine, melamine, etc.

Preferred basic materials for preparation of such salts are amines having the formula $RNH_2$ where R is selected from the group consisting of hydrocarbon radicals having 12 to 30 carbon atoms and aminohydrocarbon radicals having 12 to 30 carbon atoms.

In one embodiment, the amine employed to make the salt is an aliphatic or cycloaliphatic monoamine or polyamine. Preferred polyamines are those having the formula $RNH(CH_2)_nNH_2$ where R is a hydrocarbon radical having 12 to 30 carbon atoms and $n$ is an integer from 1 to 6. R may be aliphatic or cycloaliphatic. In one embodiment it contains the hydrocarbon residue of petroleum naphthenic acids.

Examples of suitable amines for use in preparing salts according to one embodiment of the invention are: methylamine, octadecylamine, a mixture of naphthenylamines $RCH_2NH_2$ where R has 25 to 30 carbon atoms, ethylene diamine, diethylene triamine, tetraethylene pentamine, trimethylene diamine, N-octyl trimethylene diamine, ethanolamine, triethanolamine, isopropanolamine, N-hexadecyl-N'-hydroxyethyl trimethylene diamine, etc.

The salts according to the invention contain, in one embodiment, an amino group or groups neutralized by an acidic material and a carboxyl group neutralized by a basic material. In such compositions, the salts probably contain, in varying measure depending on the strength of the acidic and basic materials and other factors, salts of the acidic and basic material with each other as well as with the amino acid. The use of a strong acid and a strong base together should be avoided in order to avoid obtaining excessive amounts of the salt from those materials to the exclusion of salts of the amino acid.

For corrosion inhibiting use, the amino acids are preferably neutralized at the carboxyl group with an amine containing at least 12 carbon atoms. The amino group or groups are preferably either unneutralized or neutralized with a carboxylic acid having at least 12 carbon atoms.

The amino acids can also be converted to fungicides by neutralizing an amino group or groups with phenol or a phenol derivative such as cresol, pentachlorophenol, etc. In such compositions, the carboxyl group of the amino acid can be neutralized with a zinc, mercury, copper, etc. compound to form the corresponding metal salt linkages with the carboxyl, thereby to contribute additionally to the fungicidal properties.

The amino acid salts according to the invention can be employed as corrosion inhibiting and detergent additives for petroleum fractions such as kerosene, lubricating oil, etc., as antisludging additives for petroleum fuels, as emulsifying agents, etc.

The amino acids according to the invention are preferably prepared by hydrolyzing the corresponding cyano compound. The latter can be prepared by cyanoethylating an amino compound, as for example:

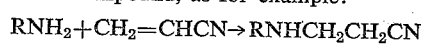

In order to obtain an amino acid containing more than one amino group, the cyano compound can, instead of being hydrolyzed, be hydrogenated to the corresponding amine, which is then cyanoethylated, as for example:

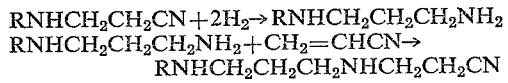
RNHCH$_2$CH$_2$CN+2H$_2$→RNHCH$_2$CH$_2$CH$_2$NH$_2$
RNHCH$_2$CH$_2$CH$_2$NH$_2$+CH$_2$=CHCN→
RNHCH$_2$CH$_2$CH$_2$NHCH$_2$CH$_2$CN The latter cyano compound can be hydrolyzed to the corresponding amino acid or treated further in the manner previously described, to build up the desired number of alkylene amine groups.

In hydrolysis operations according to the invention, it has been found that temperatures in the range from 150° C. to 300° C. are usually required. Accordingly, if the hydrolysis is performed in an aqueous medium, it is done under sufficient pressure to maintain the water in liquid phase. Alternatively, the hydrolysis is performed in a nonaqueous liquid medium, wherein the liquid has sufficiently high boiling point to permit the use of high temperatures at atmospheric pressure. Thus, for example, alkali metal hydroxide in a liquid such as diethylene glycol can be used. Other suitable liquid mediums can be employed.

In the preparation of amine salts of the amino acids, the amino acids and the amine are mixed together in the liquid or partially liquid state. The temperature is maintained below 100° C. in order to avoid formation of amide linkages. In the preparation of acid salts of the amino acids, the latter and the acid are mixed together in the liquid or partially liquid state, the temperature again being maintained below 100° C. to avoid formation of amide linkages. Amides are avoided since they give generally inferior results as corrosion inhibitors, particularly for use in preventing corrosion normally caused by oil well fluids.

The corrosion inhibiting compositions disclosed herein are particularly useful for inhibiting corrosion of metal equipment used in production and transportation of oil well fluids, including gas well fluids and gas condensate well fluids, such corrosion being normally caused by materials such as H$_2$S, CO$_2$ and lower organic acids. The inhibitors can be commingled with the well fluids in any suitable manner, e.g. by introducing them, either alone or dissolved in a suitable solvent such as an aromatic hydrocarbon solvent, into the well tubing or into the annulus between the tubing and the casing. The inhibitor can alternatively be incorporated in a solid stick inhibitor containing microcrystalline wax or other suitable material. The injection practices which are known for use with other organic inhibitors are generally suitable for use with the present inhibitor. Preferably, the inhibitor is added to the corrosive well fluids in amounts of 25 to 1000 p.p.m. based on the well fluids, e.g. a mixture of crude oil and brine. In addition to their corrosion inhibiting properties, the salts have detergency characteristics which make them useful in maintaining metal surfaces of well production equipment in clean condition, and in removing corrosion products or scale from corroded metal surfaces.

The compositions are useful in other corrosion inhibition applications also, being generally useful in protecting ferrous metals from corrosion, the protection being accomplished by means of a layer of the inhibiting composition on the metal surface. In using the compositions as corrosion inhibitors, they can be applied directly to the metal surface which is to be protected. Preferably, however, they are first dissolved in a protective hydrocarbon oil, and the solution applied to the surface. Suitable operation in the latter instance is disclosed for different inhibitors in United States Patent No. 2,736,658, and similar operation can be employed in the present instance. Preferred amounts of the inhibitor in the oil are those within the approximate range from 0.01 to 1.0 weight percent, though any larger amount which is soluble in the oil can be employed. The inhibitors can also be employed in greases comprising gelled hydrocarbon oils as described in United States Patent No. 2,736,658 previously cited. Preferred amounts of the inhibitor in the grease are those within the approximate range from 1 to 5 weight percent, though any larger amount which is compatible with the grease can also be employed.

Petroleum naphthenic acids employed to make the inhibitors according to one embodiment of the invention can be either naturally occurring petroleum naphthenic acids or naphthenic acids obtained by partial oxidation of petroleum naphthene hydrocarbons. The latter acids can be prepared for example by liquid phase partial oxidation of petroleum fractions containing substantial amounts, e.g. at least 20 weight percent, and preferably at least a major proportion, of hydrocarbons containing at least one naphthene ring. Preferred oxidation temperatures are those from 150° F. to 400° F., more preferably 200° F. to 300° F. Preferred oxidation pressures are those from atmospheric pressure to 500 p.s.i.g. Oxidizing agents comprising gaseous oxygen are preferred, e.g. oxygen itself, air, ozonized air, etc., though the well known chemical oxidizing agents such as hydrogen peroxide can also be employed. Preferably, an oxidation catalyst of the well known drier type, e.g. manganese naphthenate, is employed.

The following examples illustrate the invention:

*Example I*

Naphthenyl amines were reacted with acrylonitrile to produce N-cyanoethyl naphthenyl amines, and the latter were hydrolyzed to produce a mixture of N-naphthenyl beta-alanines having the formula

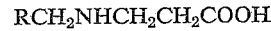
RCH$_2$NHCH$_2$CH$_2$COOH where R is a hydrocarbon residue of petroleum naphthenic acids.

The naphthenyl amines had been previously prepared from petroleum naphthenic acids sold commercially under the trademark, "Sunaptic Acids B." Typical properties for these acids are the following: acid number 159 mg. of KOH per gram, refractive index at 20° C., 1.503; average molecular formula C$_{21}$H$_{37}$O$_2$, and distillation range at 2 mm. of Hg, 287° F. to 530° F. (98%).

The reactions involved in the preparation of the N-naphthenyl beta-alanines were as follows:

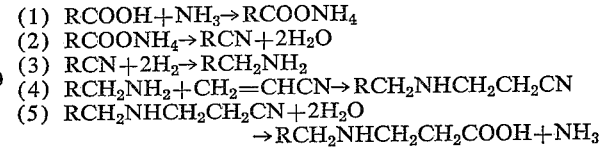
(1) RCOOH+NH$_3$→RCOONH$_4$
(2) RCOONH$_4$→RCN+2H$_2$O
(3) RCN+2H$_2$→RCH$_2$NH$_2$
(4) RCH$_2$NH$_2$+CH$_2$=CHCN→RCH$_2$NHCH$_2$CH$_2$CN
(5) RCH$_2$NHCH$_2$CH$_2$CN+2H$_2$O
→RCH$_2$NHCH$_2$CH$_2$COOH+NH$_3$ Since the petroleum naphthenic acids employed were a mixture of acids wherein R varied in structure and molecular weight from one molecule to another, R in the products of step (5) also varied in structure and molecular weight from one molecule to another.

Steps (1) and (2) of the preparation were carried out simultaneously by heating the naphthenic acids to about 300° C. while passing anhydrous ammonia therethrough, the contacting with ammonia at 300° C. being continued until the evolution of water substantially ceased. The product was vacuum distilled to obtain a mixture of nitriles as distillate product.

Step (3) was carried out by admixing 200 grams of sodium with 500 cc. of toluene, heating to melt the sodium, cooling with stirring until the sodium solidified in fine particles, and adding slowly to the mixture with stirring one mole of the nitriles produced in step (2) dissolved in 500 cc. of n-butanol; the heat evolved caused boiling, and the reaction mixture was maintained under reflux conditions; 900 cc. of additional n-butanol were added slowly, and the reaction mixture refluxed for 4 hours; more toluene was added from time to time to maintain a suitably low viscosity. At the end of the 4 hours, water was added to decompose the alcoholates and any unreacted sodium. The reaction products were then washed with water to remove sodium hydroxide. Alcohol and toluene were stripped from the naphthenyl amines. The latter were converted to acetates which were dissolved in 50% aqueous isopropanol and washed with naphtha to remove unreacted nitriles. The amines were liberated from the acetates by adding caustic soda and distilled to obtain a naphthenyl amine distillate having properties as described in the following paragraph.

In step (4) of the preparation, 180 grams of naphthenyl amines having HCl equivalent of 104 mg. of HCl per gram and calculated molecular weight of 351 and containing 3.27 weight percent of nitrogen were admixed with 106 grams of acrylonitrile, 52.8 grams of acetic acid and 198 grams of water. The mixture was refluxed 80 to 90° C. for 29 hours. The products were cooled to room temperature, made slightly alkaline with caustic soda, and contacted with benzene to extract the cyanoethylated product. The benzene layer was washed with water and then distilled to strip out benzene.

Step (5) was carried out by refluxing the N-cyanoethyl naphthenyl amines with a solution of anhydrous sodium hydroxide in diethylene glycol for 3 hours. The resulting sodium salts of N-naphthenyl alanines were acidified to produce N-naphthenyl alanines.

The mixture of N-naphthenyl alanines produced in step (5) had saponification number of 124 mg. of KOH per gram, acid number of 118 mg. of KOH per gram and nitrogen content of 2.57 weight percent.

To form a compound having an additional amino group, beginning with the same starting material, the cyano compound produced in step (4) is hydrogenated, by similar procedure to that in step (3), the amine product is cyanoethylated by similar procedure to that in step (4), and the produced hydrolyzed by similar procedure to that in step (5). A larger number of amino groups can be obtained by repeating the sequence of steps (3) and (4) the necessary number of times prior to hydrolysis.

*Example II*

The mixture of N-naphthenyl alanines produced in Example I was tested as a corrosion inhibitor for oil well fluids according to the following procedure: Approximately equal volumes of a severely corrosive kerosene saturated with hydrogen sulfide, and of brine containing 13.24 grams per liter of $CaCl_2 \cdot 2H_2O$, 3.5 g./l. of $Na_2SO_4$, 60 g./l. of NaCl, 10.68 g./l. of $MgCl_2 \cdot 6H_2O$, 1.0 g./l. of $Na_2CO_3$, and 400 to 600 p.p.m. of $H_2S$ were placed in a bottle, together with amounts of the polyamine salt mixture as indicated in the table below, expressed as parts per million based on the sum of the volumes of oil and brine. A cleaned and weighed 1/8" rod of mild steel was placed in the bottle, and the latter was sealed. The liquids nearly filled the bottle, the remaining fluid being largely air. The bottle was placed on the periphery of a drum which was rotated at a rate of about 100 revolutions per minute for a period of 24 hours. The test was carried out at room temperature. The steel rod was then removed, electrolytically cleaned, and weighed to determine the weight loss from corrosion by the oil and brine. This weight loss was compared with that obtained in a blank run with no inhibitor, and the percent reduction in weight loss by use of the inhibitor determined. The following results were obtained:

| P.p.m. | Percent protection |
|---|---|
| 400 | 96.5 |
| 200 | 93.0 |
| 100 | 84.0 |
| 80 | 79.0 |
| 67 | 66.5 |
| 50 | 2.0 |

This example shows that the mixture of N-naphthenyl alanines is an effective corrosion inhibitor for oil well fluids.

*Example III*

Salts of N-tallow trimethylene diamines with the mixture of N-naphthenyl alanines produced in Example I were prepared.

The diamines employed were a material known by the trademark "Duomeen T" and comprised a mixture of diamines having the formula $RNHCH_2CH_2CH_2NH_2$ where R is a hydrocarbon radical derived from tallow, the average molecular weight of the mixture of diamines being 320. Since the mixture of diamines is not pure, the combining weight of Duomeen T is about 400.

Mono-salts were prepared by admixing the diamines with the theoretical amount of N-naphthenyl alanines required to neutralize one amino group of the diamines with the carboxyl group of the naphthenyl alanines. Di-salts were also prepared by using twice that amount of the naphthenyl alanines.

*Example IV*

The salts prepared in Example III were tested as oil well corrosion inhibitors by the method described in Example II. The following results were obtained:

| P.p.m. | Percent Production | |
|---|---|---|
| | Mono-Salts | Di-Salts |
| 400 | 96.5 | 95.5 |
| 200 | 89.5 | 93.5 |
| 100 | 87.0 | 97.0 |
| 80 | 84.0 | 92.5 |
| 67 | 59.0 | 86.0 |
| 50 | 16.0 | 73.0 |

This example indicates that N-tallow trimethylene di-amine di(N-naphthenyl alanine) salts are superior oil well corrosion inhibitors as compared with N-tallow trimethylene diamine mono(N-naphthenyl alanine) salts, and also, by comparison with Example II, as compared with unneutralized N-naphthenyl alanines.

Generally similar results are obtained using other amino acids and amino acid salts according to the invention, such as N-dodecyl alanine; N-dodecyl alanine salt of lauric acid; N-naphthenyl (25 to 30 carbon atoms) alanine salt of octadecylamine; the N-hexadecyl amino acid $C_{16}H_{33}NHCH_2CH_2CH_2NHCH_2CH_2COOH$; acetic acid salt of the latter amino acid; and other amino acids as disclosed previously in this specification and salts of such amino acids with acidic and basic materials as disclosed previously in this specification.

Oxyalkylene derivatives of the amino acids according to the invention can be prepared by contacting the amino acids with a suitable epoxide, e.g. ethylene oxide, propylene oxide, 1,2-epoxybutane, 1-methyl-2,3-epoxybutane, etc. The reaction may take place at an amino group or carboxyl group or both. Preferably, 1 to 20 moles of epoxide are caused to react per mole of amino acid. Hydroxyalkyl or polyoxyalkylene radicals or both may be present in the products. The oxyalkylene derivatives and salts thereof are effective corrosion inhibitors, e.g. for oil well fluids.

In a typical example, 10 moles of ethylene oxide are reacted at 400° F. with one mole of the mixture of N-naphthenyl alanines produced in Example I, 0.5 percent of potassium carbonate based on the amino acids being employed as catalyst. The reaction products are effective corrosion inhibitors for oil well fluids and other systems.

The invention claimed is:
1. A method for inhibiting corrosion normally caused by oil well fluids which comprises introducing into oil well fluids containing corrosive agents selected from the group consisting of hydrogen sulfide, carbon dioxide and lower organic acids, which come in contact with ferrous metal surfaces, a compound selected from the group consisting of compounds having the formula $$R(NHCH_2CH_2CH_2)_nNHCH_2CH_2COOH$$

where R is a hydrocarbon radical containing 12 to 30 carbon atoms, and $n$ is an integer from 0 to 5, and salts thereof.

2. A method according to claim 1 wherein R is a naphthenyl radical derived from petroleum naphthenic acids.

3. A method according to claim 1 wherein said compound is a salt of a compound having said formula with an amine having the formula $RNH(CH_2)_nNH_2$ where R is a hydrocarbon radical having 12 to 30 carbon atoms and $n$ is an integer from 1 to 6, both amino groups of said amine being neutralized with said compound.

4. A method according to claim 1 wherein said compound has the formula $RNHCH_2CH_2COOH$ where R is a hydrocarbon radical containing 12 to 30 carbon atoms.

5. A method for inhibiting corrosion normally caused by oil well fluids which comprises introducing into oil well fluids containing corrosive agents selected from the group consisting of hydrogen sulfide, carbon dioxide and lower organic acids, which come in contact with ferrous metal surfaces, a salt of a compound having the formula $$R(NHCH_2CH_2CH_2)_nNHCH_2CH_2COOH$$

where R is a hydrocarbon radical containing 12 to 30 carbon atoms, and $n$ is an integer from 0 to 5 with an amine having 12 to 30 carbon atoms per molecule and selected from the group consisting of aliphatic amines and cycloaliphatic amines.

6. A method according to claim 5 wherein $n$ in said formula is 0, and said amine is an aliphatic amine.

7. A method for inhibiting corrosion normally caused by oil well fluids which comprises introducing into oil well fluids containing corrosive agents selected from the group consisting of hydrogen sulfide, carbon dioxide and lower organic acids, which come in contact with ferrous metal surfaces, a salt of a compound having the formula $$R(NHCH_2CH_2CH_2)_nNHCH_2CH_2COOH$$

where R is a hydrocarbon radical containing 12 to 30 carbon atoms, and $n$ is an integer from 0 to 5, with a carboxylic acid containing 12 to 30 carbon atoms.

References Cited in the file of this patent
UNITED STATES PATENTS

| | | |
|---|---|---|
| 2,598,213 | Blair | May 27, 1952 |
| 2,698,295 | Cardwell | Dec. 28, 1954 |
| 2,734,081 | Boatright | Feb. 7, 1956 |
| 2,736,658 | Pfohl et al. | Feb. 28, 1956 |
| 2,802,784 | Nowak et al. | Aug. 13, 1957 |
| 2,810,752 | Freese | Oct. 22, 1957 |
| 2,828,259 | Wirtel et al. | Mar. 25, 1958 |
| 2,840,584 | Jones | June 24, 1958 |
| 2,851,344 | Marsh et al. | Sept. 9, 1958 |
| 2,851,345 | Marsh et al. | Sept. 9, 1958 |
| 2,888,399 | Wirtel et al. | Mar. 26, 1959 |
| 2,926,108 | Anderson | Feb. 23, 1960 |